United States Patent
Oishi

(10) Patent No.: US 9,681,018 B2
(45) Date of Patent: Jun. 13, 2017

(54) INFORMATION PROCESSING DEVICE AND NON-TRANSITORY COMPUTER-READABLE MEDIUM STORING INSTRUCTIONS FOR PRINT CONTROL

(71) Applicant: BROTHER KOGYO KABUSHIKI KAISHA, Nagoya, Aichi (JP)

(72) Inventor: Minoru Oishi, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/084,573

(22) Filed: Mar. 30, 2016

(65) Prior Publication Data

US 2016/0292543 A1 Oct. 6, 2016

(30) Foreign Application Priority Data

Mar. 31, 2015 (JP) ................................ 2015-074017

(51) Int. Cl.
| | |
|---|---|
| G06K 15/02 | (2006.01) |
| G06K 15/00 | (2006.01) |
| H04N 1/23 | (2006.01) |
| H04N 1/00 | (2006.01) |
| G06F 3/12 | (2006.01) |

(52) U.S. Cl.
CPC ............ *H04N 1/2369* (2013.01); *G06F 3/12* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,827,514 B1 * | 12/2004 | Shima ................... | G06F 3/1208 400/582 |
| 2008/0144066 A1 * | 6/2008 | Ferlitsch ............ | H04N 1/00222 358/1.13 |
| 2010/0328704 A1 * | 12/2010 | Feng ..................... | G06F 3/1262 358/1.15 |

FOREIGN PATENT DOCUMENTS

| | | |
|---|---|---|
| JP | HEI 11-212741 A | 8/1999 |
| JP | 2008282404 A * | 11/2008 |
| JP | 2012-98938 A | 5/2012 |

* cited by examiner

*Primary Examiner* — Thomas D Lee
(74) *Attorney, Agent, or Firm* — Scully, Scott, Murphy & Presser, PC

(57) ABSTRACT

An information processing device is connected to a printing device, and has a storage device. Multiple pieces of application-generated data corresponding to multiple documents are generated by an application program. When a piece of application-generated data is obtained, it is temporarily stored in a storage device every time. When a particular print instruction is received, multiple pieces of application-generated data stored in the storage device are combined to generate a single piece of combined print data. The combined print data representing a combination of the multiple pieces of application-generated data respectively corresponding to multiple documents. The pages of images represented by the combined print data are continuously arranged, and is output to the printing device.

19 Claims, 13 Drawing Sheets

STORED DATA MANAGEMENT TABLE

| APPLICATION-GENERATED DATA FILE NAME | THUMBNAIL DATA |
|---|---|
| FILE A | ICON DATA 001 |
| FILE B | ICON DATA 002 |
| FILE C | ICON DATA 003 |
| FILE D | ICON DATA 004 |
| ⋮ | ⋮ |

FIG. 11

< PRINTER PROPERTY WINDOW > — 80
PROPERTY: MFP-12345 of ABC Corp.

ABC MFP-12345

Sheet Size: A4
210mm x 297mm
(8.3 x 11.7 inches)

Sheet Type: Normal
Number of Copies: 1
Print Quality: Standard (600 x 600 dpi)

Duplex/Booklet Printing: None
Magnification/Reduction: Off
Watermark Printing: Off
Secure Printing: Off Basic Setting | Enhanced Setting — 81

Sheet Size: A4 — A4
Sheet Orientation — ●Portrait (I)  ○Landscape (L)
Number of Copies (C) — 1  ☑Unit of Copies (E)
Sheet Type (Y) — Normal
Print Quality (Q) — Standard (600 x 600 dpi)
Color/Monochrome (M) — ☐ Color/Monochrome Automatic Switching
Continuous Printing — ● Print Collectively — 82

Layout (G) — 1 Page
Page Order (P) — from Upper Left to Right
Partition Line (B) — None
Duplex/Booklet (K) — Duplex Print Setting Sheet Feed Method
First Page (F) — Automatic Selection
Second Page and Later (O) — Same as First Page

[ Restore Standard Setting (D) ]

[ Support (U) ]   [ OK ]  [ Cancel ]  [ Help (H) ]

INFORMATION PROCESSING DEVICE AND NON-TRANSITORY COMPUTER-READABLE MEDIUM STORING INSTRUCTIONS FOR PRINT CONTROL

CROSS-REFERENCE TO RELATED APPLICATION

This application claims priority under 35 U.S.C. §119 from Japanese Patent Application No. 2015-074017 filed on Mar. 31, 2015. The entire subject matter of the application is incorporated herein by reference.

BACKGROUND

Technical Field

The present disclosures relate to an image processing device to which a printer is connected, and a non-transitory computer-readable medium storing instructions which, when executed by a controller of the information processing device, controls the information processing device to control the printer in accordance with the print control method.

Related Art

A user of an information processing device may wish to print different print jobs to print documents and images respectively generated by different application programs continuously.

In such a case, if the user transmits each piece of print data with appropriate print setting to the printer, all the different print jobs can be printed continuously as a result. However, such a method is troublesome for the user and time consuming, and inconvenient to the user.

SUMMARY

There is known a technique in which a print job of a simplex printing (i.e., one-side printing) and another print job of a duplex printing (i.e., both-side printing) are combined to generate an integrated single duplex print job. The simplex print job is modified to a pseudo duplex print job by inserting blank pages, and thus generated pseudo duplex print job and the other duplex print job are combined, thereby one integrated duplex print job being generated.

According to such a configuration, although the two print jobs are integrated into a single print job, the simplex printing is executed for the simplex print job as a result, and the duplex printing is executed for the duplex print job. That is, the result of executing the integrated print job is merely the same as the result of a case where the two print jobs are executed separately.

In consideration of the foregoing, the present disclosures provide a printer control method, an improved printer and a non-transitory computer-readable medium storing a program realizing the improved print control method.

According to aspects of the disclosures, there is provided a non-transitory computer-readable medium for an information processing device, the information processing device having a storage device configured to store data and a controller, the computer-readable medium storing instructions which, when executed by the controller, causing the information processing device to control a printing device connected to the information processing device. The instructions cause the controller to execute to obtain a piece of application-generated data which is data generated by an application program and representing images to be printed on one or more pages of printing sheets, to temporarily store the application-generated data in the storage device every time when the piece of application-generated data is obtained, to receive a particular print instruction, to combine multiple pieces of application-generated data stored in the storage device to generate combined print data, the combined print data representing a combination of images represented by each of the multiple pieces of application-generated data so that pages of images represented by the multiple pieces of application-generated data are continuously arranged, and to output the generated combined print data to the printing device.

According to aspects of the disclosures, there is further provided an information processing device, which includes a storage device configured to store data, and a controller. The controller is configured to execute to obtain a piece of application-generated data which is data generated by an application program and representing images to be printed on one or more pages of printing sheets, to temporarily store the application-generated data in the storage device every time when the piece of application-generated data is obtained, to receive a particular print instruction, to combine multiple pieces of application-generated data stored in the storage device to generate combined print data, the combined print data representing a combination of images represented by each of the multiple pieces of application-generated data so that pages of images represented by the multiple pieces of application-generated data are continuously arranged, and to output the generated combined print data to the printing device.

According to aspects of the disclosures, there is further provided an information processing device connected to a printing device, which has a storage device configured to store data and a controller. The controller is configured to obtain multiple pieces of application-generated data respectively corresponding to multiple pieces of documents to be printed, store the obtained multiple pieces of application-generated data in the storage device, determine combining order of the multiple pieces of application-generated data stored in the storage device, combine the multiple pieces of application-generated data in accordance with the determined combined order to generated combined application-generated data, generated single piece of print data based on the combined application-generated data with applying a particular printing option, and transmit the generated single piece of print data to the printing device.

BRIEF DESCRIPTION OF THE ACCOMPANYING DRAWINGS

Figures 4, 5:
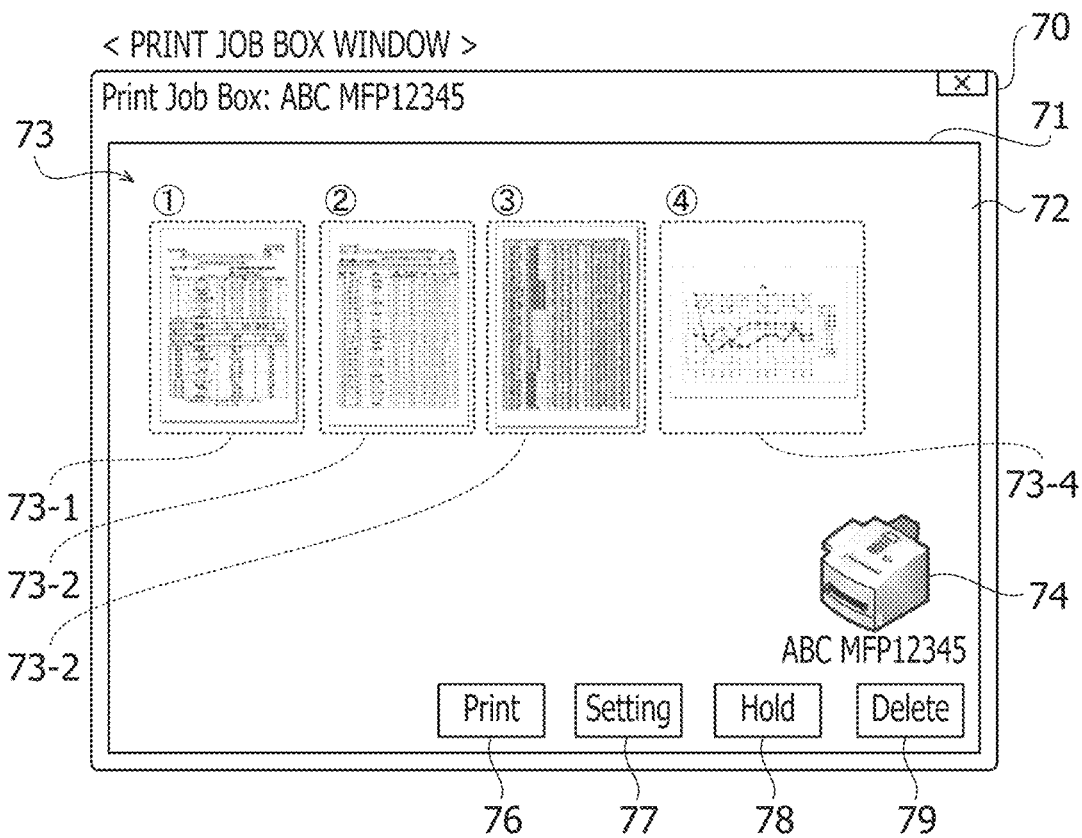

FIG. 4 schematically shows an example of a storage data management table according to the first illustrative embodiment of the disclosures.

FIG. 5 shows an example of a print job box window according to the first illustrative embodiment of the disclosures.

Figure 6:
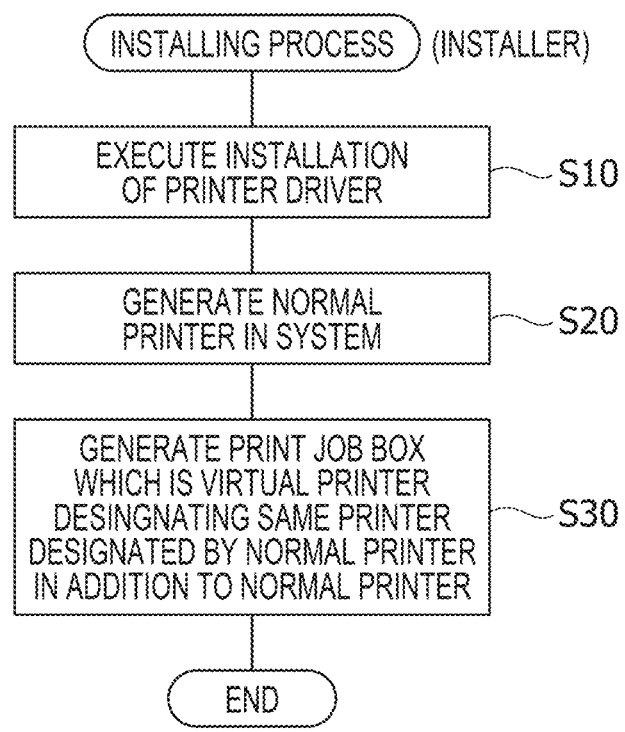

FIG. 6 is a flowchart illustrating an installing process according to the first illustrative embodiment of the disclosures.

Figure 7:
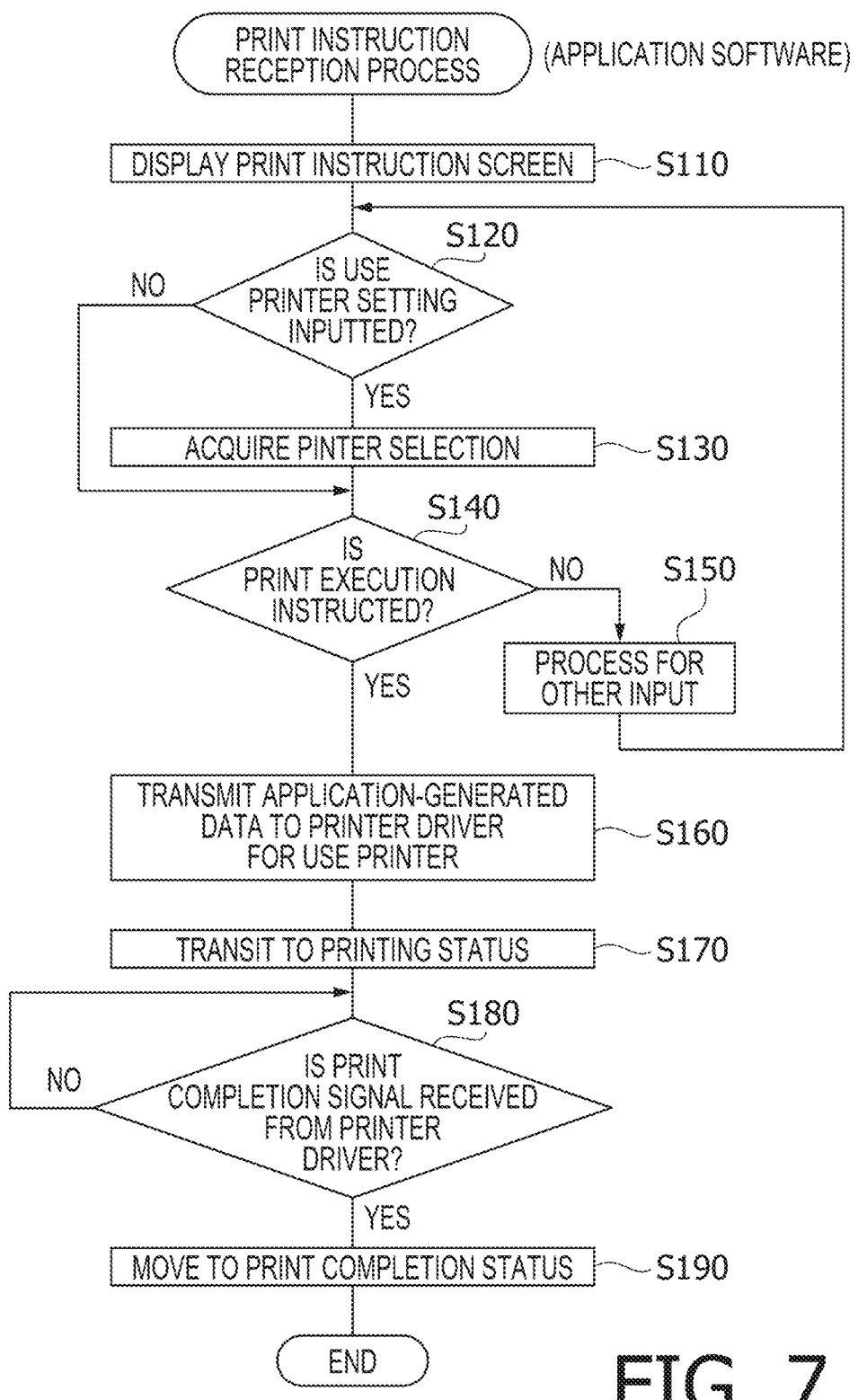

FIG. 7 is a flowchart illustrating a print instruction reception process according to the first illustrative embodiment of the disclosures.

Figure 8:
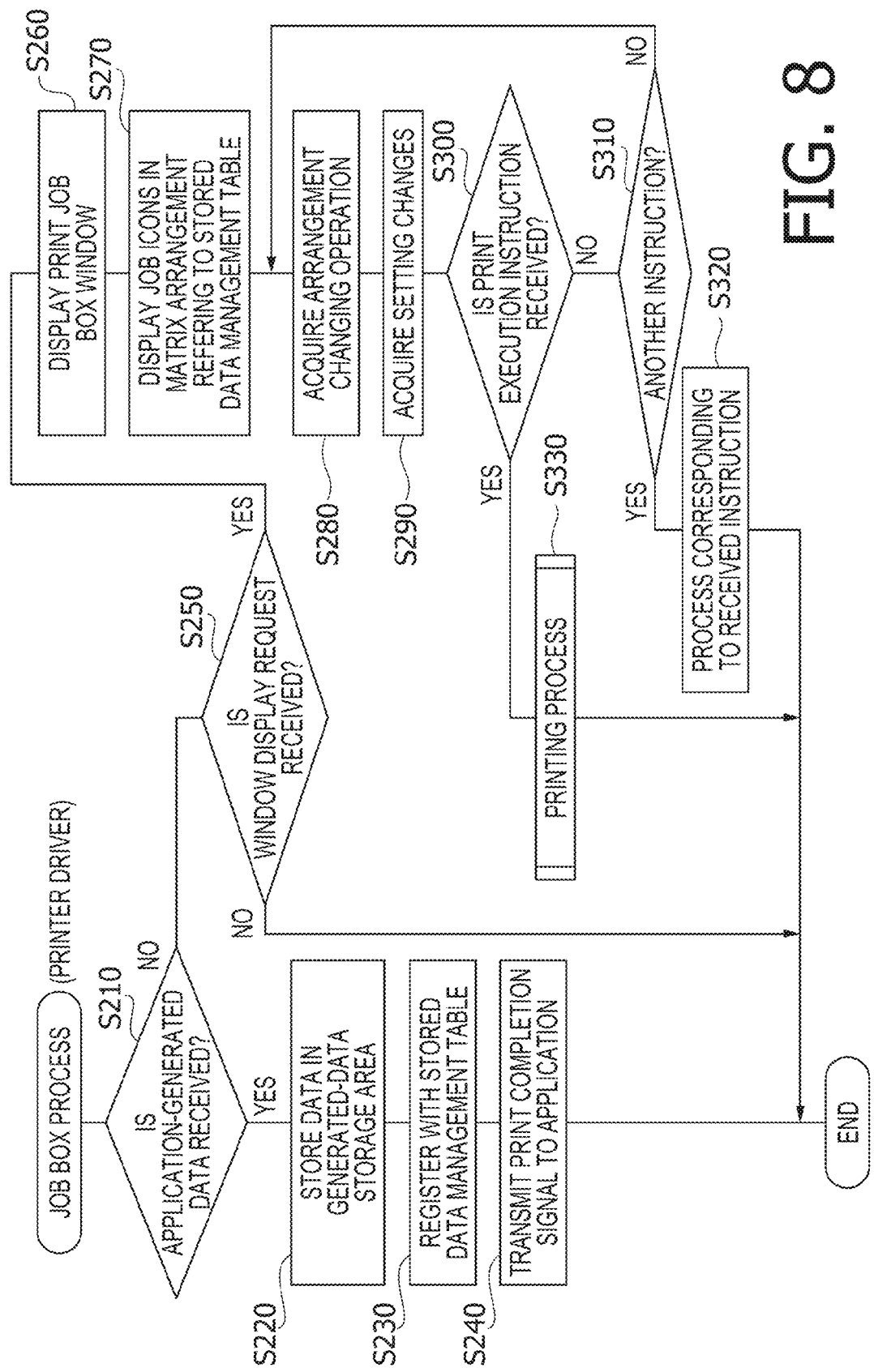

FIG. 8 is a flowchart illustrating a job box process according to the first illustrative embodiment of the disclosures.

Figure 9:
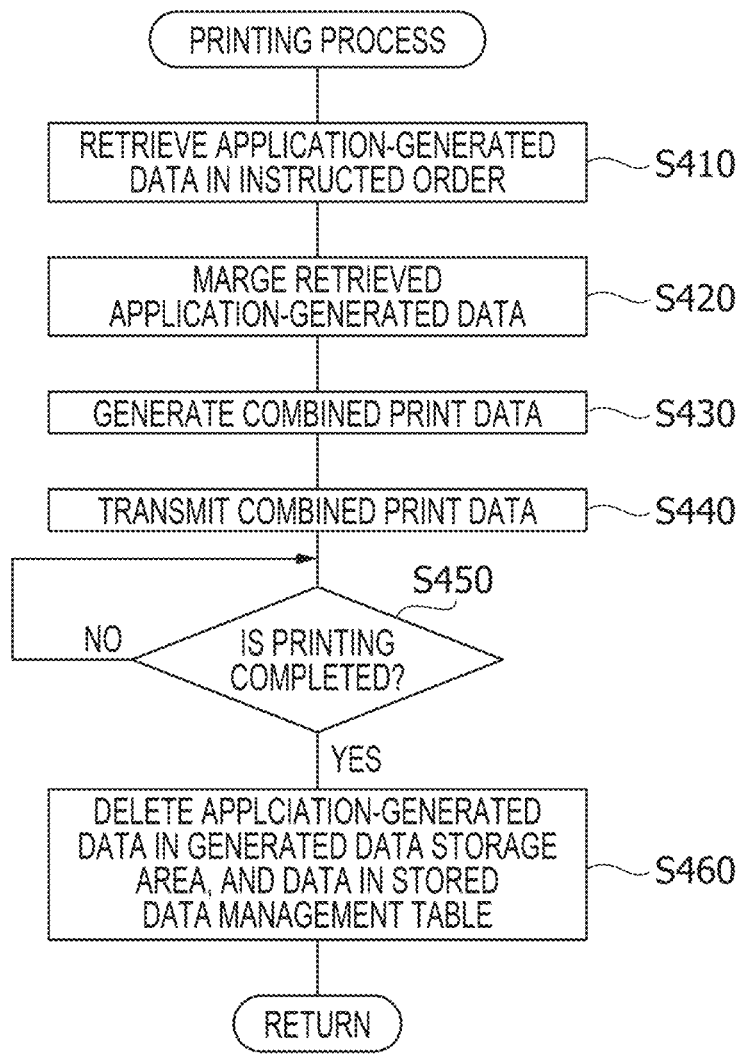

FIG. 9 is a flowchart illustrating a printing process according to the first illustrative embodiment of the disclosures.

Figure 10:
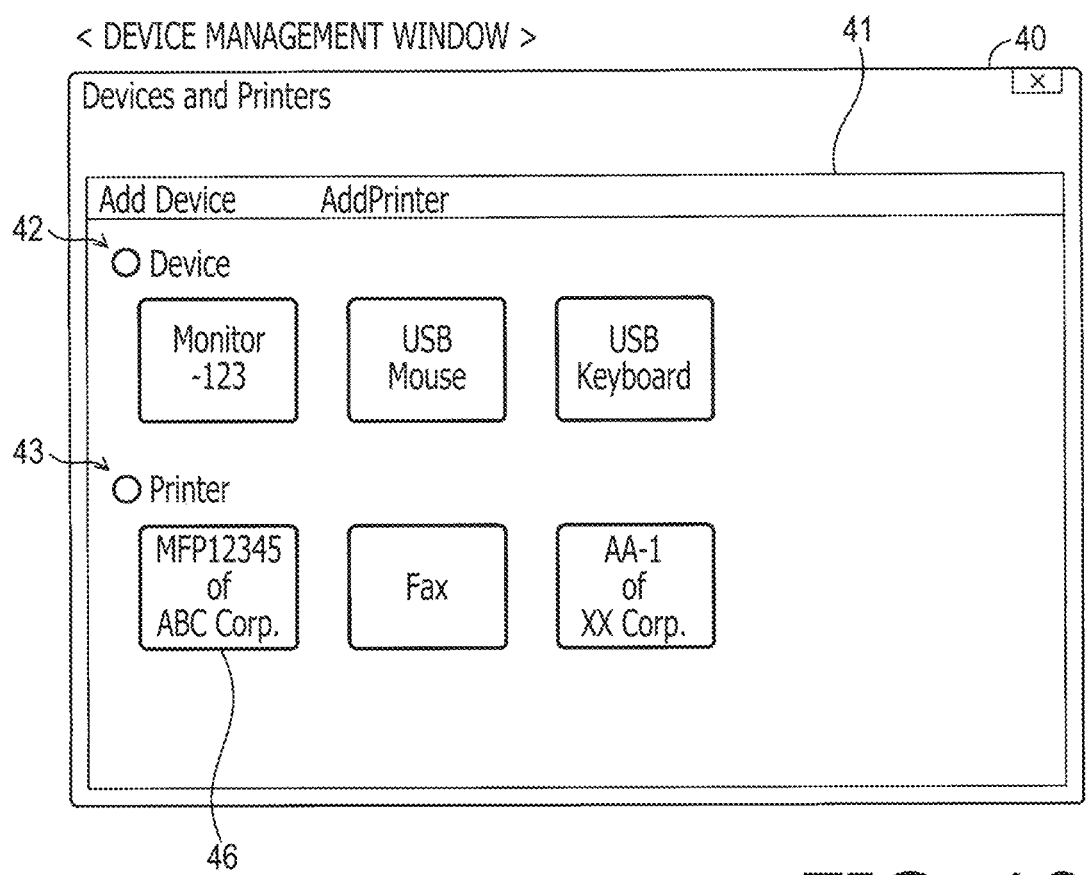

FIG. 10 shows an example of a device management window according to a second illustrative embodiment of the disclosures.

FIG. 11 shows an example of a printer property window according to the second illustrative embodiment of the disclosures.

Figure 12:
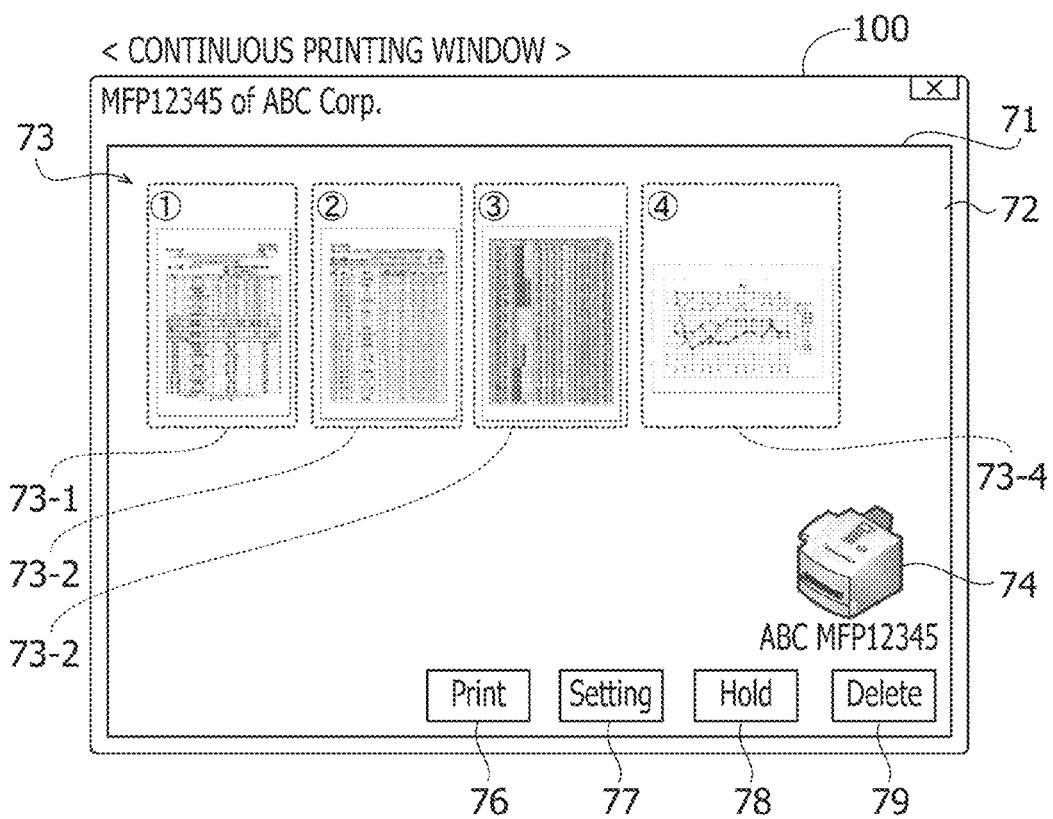

FIG. 12 shows an example of a continuous printing window according to the second illustrative embodiment of the disclosures.

Figure 13:
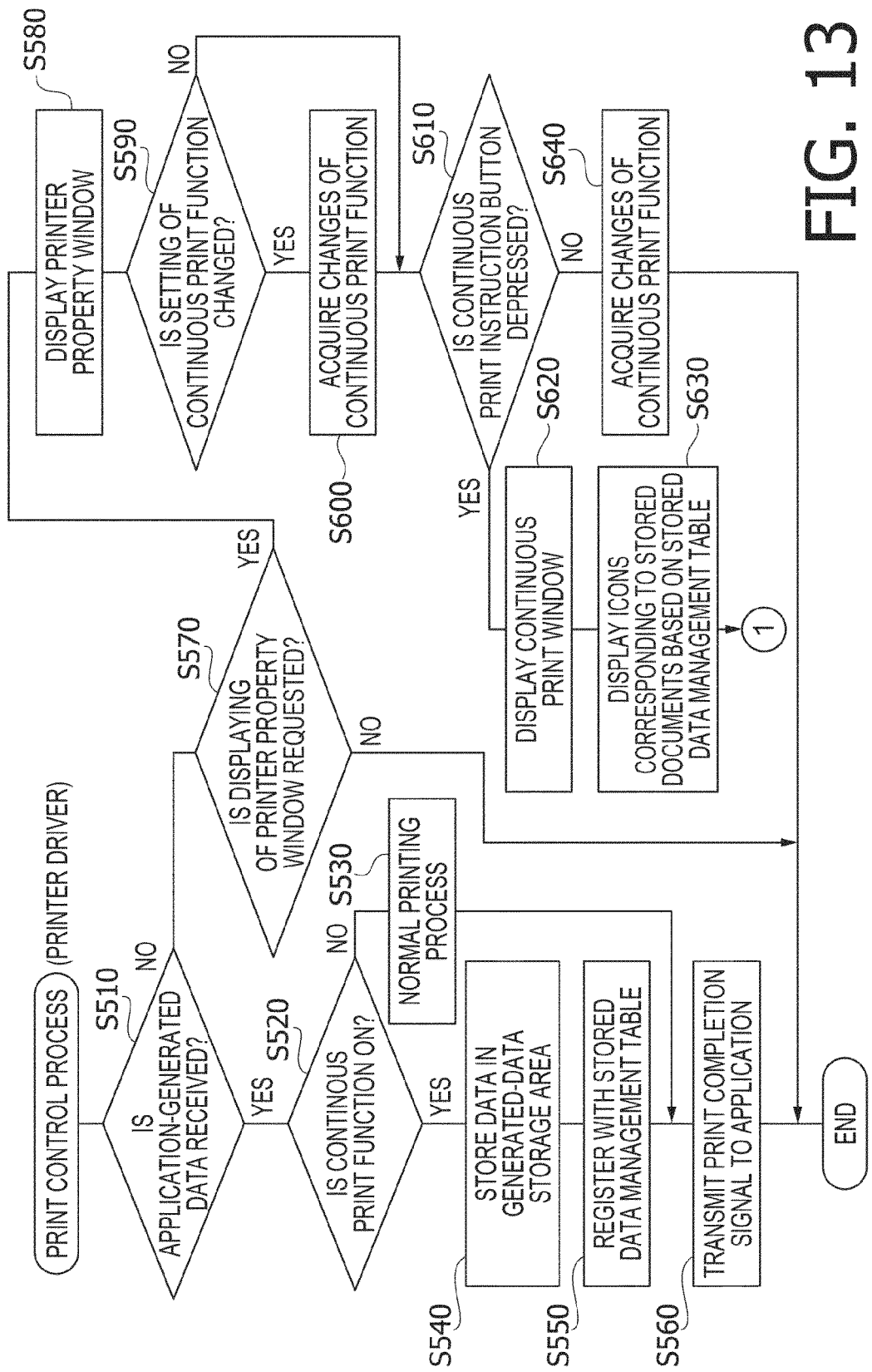
Figure 14:
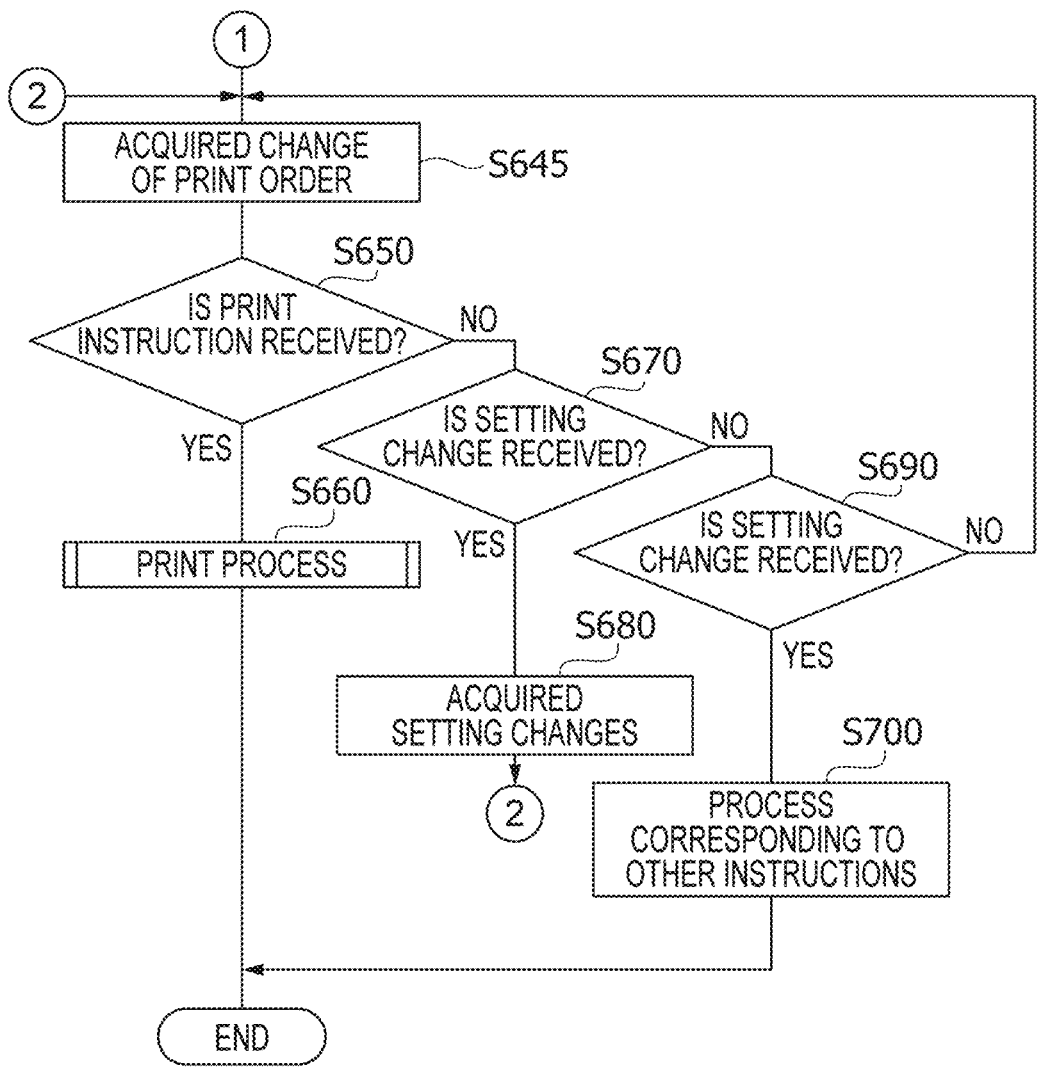

FIGS. 13 and 14 show a flowchart illustrating a print control process according to the second illustrative embodiment of the disclosures.

DETAILED DESCRIPTION OF THE EMBODIMENTS

Hereinafter, referring to the accompanying drawings, two illustrative embodiments will be described.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

First Illustrative Embodiment (1) General Description of Print System

Figure 1:
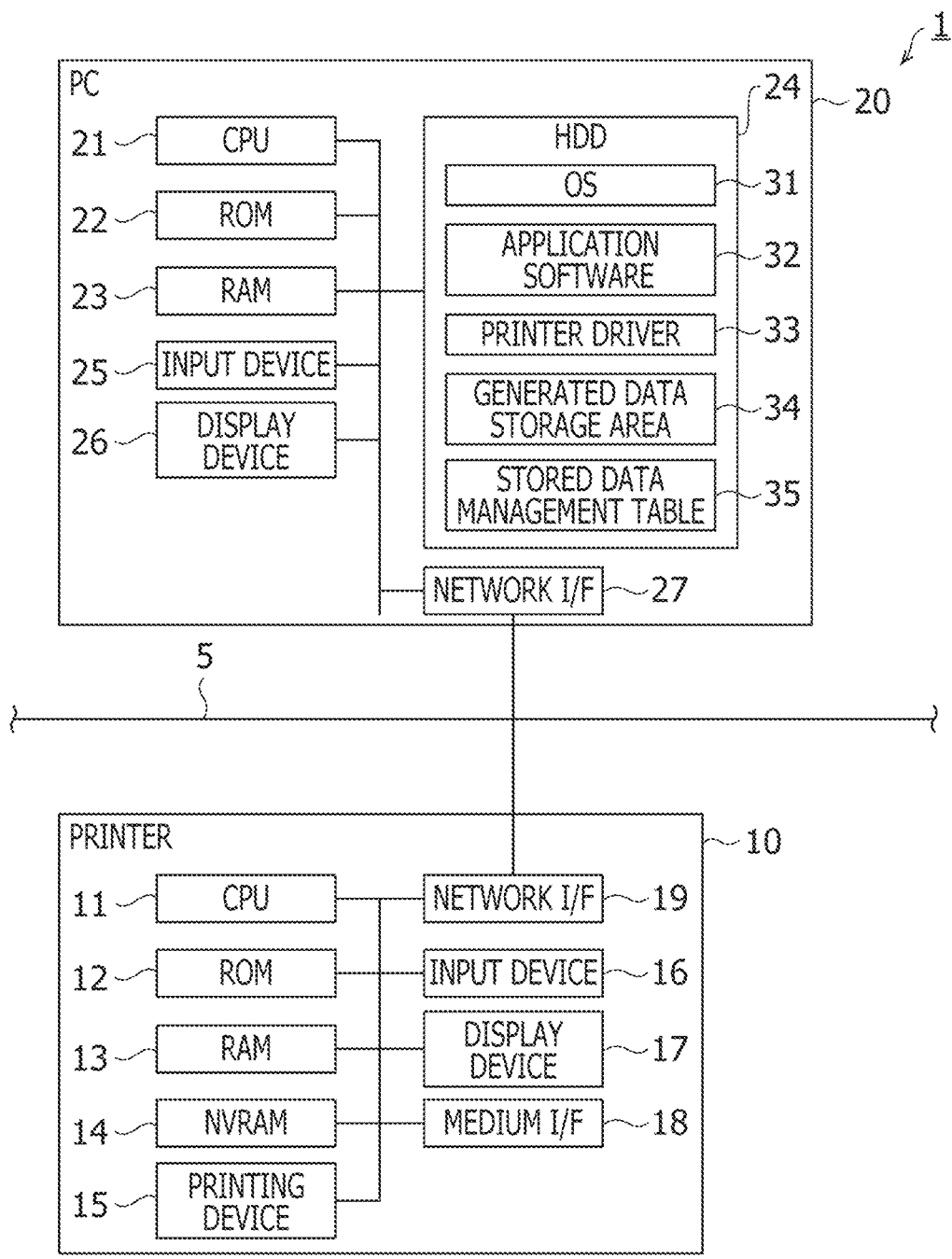
FIG. 1 is a block diagram showing a system configuration of a printing system according to an illustrative embodiment of the disclosures.

A print system 1 according to a first illustrative embodiment is configured to have a printer 10 and a PC (Personal Computer) 20 as shown in FIG. 1. It is noted that only one PC 20 is shown in FIG. 1, the print system 1 may have multiple PC's 20. In the following description, the one PC 20 will be referred to for brevity. The printer 10 and the PC 20 are connected through a LAN (Local Area Network) cable 5, thereby a data communication being performed between the PC 20 and the printer 10.

It is noted that the printer 10 and the PC 20 may be configured to execute the data communication through another network other than the wired LAN which uses the LAN cable 5. That is, the print system 1 may employ a wireless LAN instead of the wired LAN which uses the LAN cable 5. In such a case, the printer 10 and the PC 20 executes the data communication through the wireless LAN.

(2) Configuration of Printer 10

The printer 10 has a function of printing out images represented by various pieces of image data such as image data transmitted from the PC 20 or another device, the image data received via computer-readable recording medium and the like onto printing sheets. The PC 20, which is connected to the printer 10 so as to execute the data communication with the printer 10, is capable of causing the printer 10 to print images by transmitting the image data to the printer 10.

As shown in FIG. 1, the printer 10 has a CPU (Central Processing Unit) 11, a ROM (Read Only Memory) 12, a RAM (Random Access Memory) 13, an NVRAM (Non-Volatile RAM) 14, an printing device 15, an input device 16, a display device 17, a media interface (hereinafter, referred to as media I/F) 18 and a network interface (hereinafter, referred to as a network I/F) 19.

The CPU 11 controls components inside the printer and executes calculations/operations in accordance with programs stored in the ROM 12 or the NVRAM 14. The RAM 13 is mainly used as a main memory directly accessed by the CPU 11. The NVRAM 14 is an electrically-rewritable non-volatile memory, and stores setting information related to the printer 10.

The printing device 15 has a function of printing image data on the printing sheets. The input device 16 is a device configured to receive user inputs and provided with inputting units such as a touch panel, operation buttons and the like. The display device 17 is configured to display information and images. The display device 17 has an LCD (liquid crystal device) as a displaying device capable of display images and information. The touch panel mentioned above is overlaid on a display area of the display device 17 to constitute a touchscreen.

The media I/F 18 is an interface configured to read/write data with respect to computer-readable recording media compliant with various standards (e.g., a memory compliant with a USB (Universal Serial Bus)). The network I/F 19 is an interface enabling the printer 10 to connect with the LAN using the LAN cable 5.

When print data is received from the PC 20, the printer 10 starts printing on the printing sheets. The pint data from the PC 20 is received per each print job. The printer 10 is configured to execute printing per each print job. The printer 10 has printing functions such as an N-in-one printing to print multiple pages (N pages) on the same surface of one printing sheet, a duplex printing to print images on both sides of the same printing sheet, and the like. Whether each of such functions is to be used or not can be set when the user transmits print data from the PC 20.

(3) Configuration of PC 20

The PC 20 has a CPU 21, a ROM 22, a RAM 23, an HDD (Hard Disk Drive) 24, an input device 25, a display device 26 and a network I/F 27.

The CPU 21, controls components of the PC 20 and external devices (e.g., the printer 10) by executing programs stored in the ROM 22 and the HDD 24. The ROM 22 stores programs to be executed by the CPU 21 and data to be used when the CPU 21 executes the programs. The RAM 23 is used as a main memory when the CPU 21 executes various processes (i.e., various programs).

The HDD 24 stores various kinds of application software including an OS (Operation System) 31, device drivers, application software 32 and the like. The application software 32 includes various kinds of software for creating documents, spreadsheets, presentation materials, image processing and the like. The documents, spreadsheets, presentation materials and images (which will be referred collectively as documents) can be printed by the printer 10.

The device drivers installed in the HDD 24 includes a printer driver 33 which is used when a printing function of the printer 10 is used. With use of the printer driver 33, it is possible to transmit the print data from the PC 20 to the printer 10 and cause the printer 10 to print the same.

Further, in the HDD 24, a generated data storage area 34 is secured. The generated data storage area 34 is used to temporarily store application-generated data 34, which is the data representing the documents generated by the application software 32 and subject to print. The generated data storage area 33 is secured and used by the printer driver 33.

The display device 26 has a displaying device such as an LCD, an organic EL (Electro Luminescent) display or the like. The network I/F 27 is a communication interface used to connect the PC 20 to the LAN and the LAN cable 5 is connected thereto.

The input device 25 has various inputting devices such as a keyboard, a mouse and a touch panel. The touch panel is overlaid on an image displaying area of the display device 26 to constitute a touchscreen.

The user of the PC 20 can cause the display to display various pieces of information, designate items and/or images displayed on the display device 26, move images on the display device 26 by performing input operations through the input device 25. For example, with a particular input operation through the input device 25, the user can select one or more of the images displayed on the display device 26. For another example, the user can move an image by a drag-and-drop operation through the input device 25.

(4) Description on Continuous Printing Function

The documents generated by the application software 32 can b printed by the printer 10 as a single print job. In the application software 32, when the printer 10 is designated as a target device to be used for printing, and a print instruction of a print job is performed, the printer driver 33 transmits print data for the designated print job to the printer 10 every time the print instruction is made. With this configuration, in the printer 10, printing of the print jobs are executed on a job basis.

In addition to the above-described normal printing function, the printer driver 33 according to the first illustrative embodiment has a continuous printing function. The continuous printing function in this description stands for a function of combining multiple documents to create a single (collective) print job (hereinafter, referred to a combined print job), and transmits print data (hereinafter, referred to as combined print data) of the combined print job to the printer 10, thereby the multiple documents as combined being printed such that pages of the multiple documents are outputted continuously.

The printer driver 33 which is necessary to use the printer 10 from the PC 20 can be installed in accordance with a plug-and-play function or with use of an installer in the PC 20. It is noted that, according to the illustrative embodiment, when the printer driver 33 is installed, two printers are set as printers available to the PC 20.

One of the two printers is the printer 10. Specifically, the printer 10 is set as a normal printer. Every time when a print instruction of a print job is issued by the application software 32, the normal printer is set as a printer used for printing the print job.

It is noted that another printer is set in order to realize the continuous printing function. The printer for the continuous printing function is set separately from the normal printer. The printer which actually print images on the printing sheets is the printer 10, and the above-described printer for the continuous printing function is a virtual printer, which will be referred to as a pint job box hereinafter.

Figure 2:
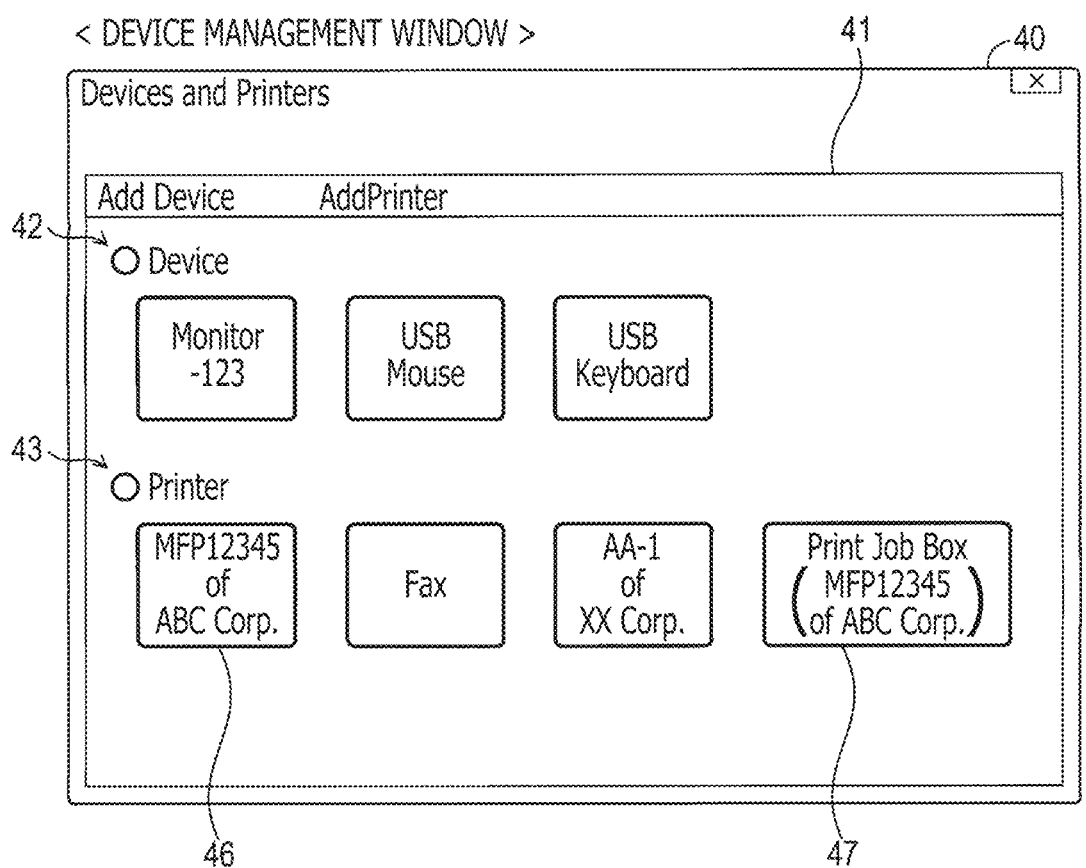
FIG. 2 shows an example of a device management windows according to a first illustrative embodiment of the disclosures.

When the user performs a particular inputting operation, via the input device 25, with respect to the PC 20, the OS 31 causes the display device 26 to display a device management window 40 as shown in FIG. 2. In the device management window 40, various devices and printers, which are recognized and managed by the OS 31 and can be used by the user, are displayed. For example, in the device management window 40, device management information 41 (see FIG. 2) is displayed. The device management information 41 includes device list information 42 which is a list of icons respectively representing usable printers, and printer list information 43 which is a list of icons respectively representing usable printers.

In the printer list information 43, icons of the printers generated in the system are displayed as a list, the a normal printer icon 46 representing the nominal printer and a job box icon 47 representing the print job box are included in the printer list information 43. It is noted that the actual destination of print data directed from each of the normal printer and the print job box is the printer 10. According to the illustrative embodiment, it is assumed that printer MFP12345 of ABC Corp. is used as the printer 10.

When the user wishes to print out created documents during execution of the application software 32, the user performs a particular print change operation on an execution screen of the application software 32. When the print change operation is performed, the application software 32 causes the display device 26 to display a print instruction screen 50 shown in FIG. 3.

In the print instruction screen 50, a print setting tab 51 which is used to perform various settings necessary to print documents is displayed. On the print setting tab 51, print preview images 52 of the documents subject to print are displayed. Further, on the print setting tab 51, a print execution button 61, a printer selection box 62, a printer property button 63 and the like are displayed.

Figure 3:
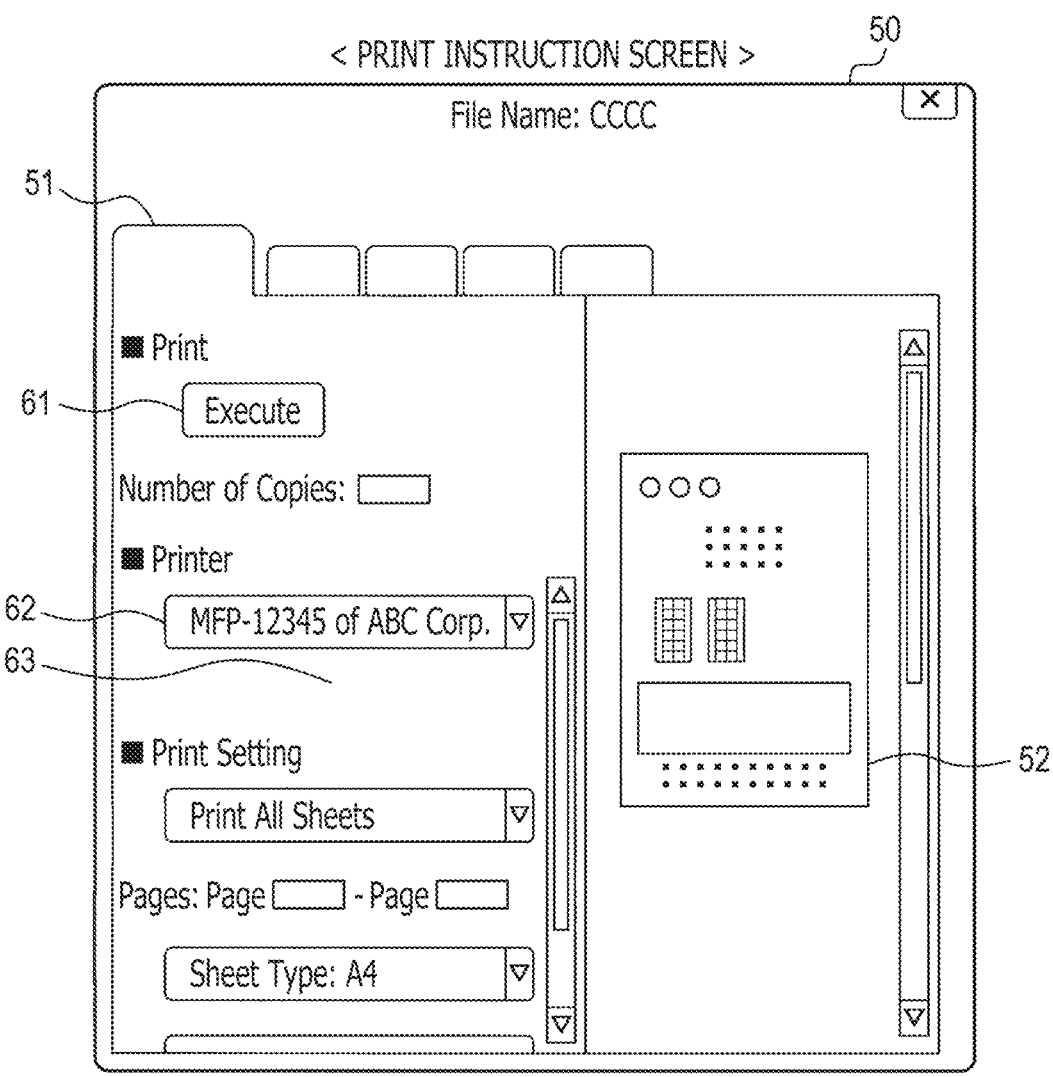
FIG. 3 shows an example of a print instruction screen according to the first illustrative embodiment of the disclosures.

The printer selection box 62 is a drop down list, which shows printers generated by the OS 31 (see FIG. 2) as a list, from which the user can select a printer, to be used (hereinafter, also referred to as a use printer). FIG. 3 shows an example in which printer MFP12345 of ABC Corp. is being selected. It is noted that, through the printer selection box 62, the user can select the print job box as the use printer (i.e., the printer to be used).

When the printer property 63 is depressed (e.g., a left-click of mouse, a tap operation on the touch panel, or the like), a window through which setting related to the printer which is selected in the printer selection box 62 can be made, is displayed. When the selected printer is the normal printer, a printer property window for making settings related to the normal printer is displayed. Since such a property window according to the first illustrative embodiment is omitted for brevity, a basic configuration of the property window according to the first illustrative embodiment is similar to that of a property window 80 according to the second illustrative embodiment shown in FIG. 11. In the property window 80 shown in FIG. 11, a continuous printing function button 81 and a continuous print instruction button 82 are shown. According to the first illustrative embodiment, such buttons 81 and 82 are not shown in the printer property window for the normal printer.

The print execution button 61 is a button which makes the printer selected in the printer selection box 62 execute printing. In a state where the normal printer is selected in the printer selection box 62, when the print execution button 61 is depressed (i.e., the print instruction is made), print data corresponding to the print job which is designated, as a print job subject to print, from among the documents generated by the application software 32 is transmitted to the printer 10, and printing by the printer 10 is started.

When the user designates the print job box in the printer selection box 62 and depresses the print execution button 61, the application-generated data (i.e., the document), which is selected from among the documents generated by the application software 32 and is designated to be subject to print is stored in the generated data storage area 34. At that time, a file name of the stored application-generated data and a thumbnail data thereof are stored in the stored data management table 35.

The stored data management table 35 is a table which is used to manage the application-generated data temporarily stored in the generated data storage are 34 as the print job box is selected as the use printer (i.e., the printer to be used). Every time when the print instruction designating the print job box as the use printer is issued, a file name and thumbnail data of the application-generated data which is the subject of the print instruction are stored in the stored data management table 35 subsequently. The thumbnail data is data representing a reduced image of a particular page (e.g., a first page) of the document represented by the application-generated data, and is displayed in a print job box window 70, which will be described later with reference to FIG. 5, as a job icon.

When the user wishes to print out multiple document such that the pages of the multiple documents are output continuously, the user designate the print job box as the use printer in the print instruction screen 50 of the application software 32. When the print job box is designated as a printer to print a document, the document is not printed immediately, and the application-generated data of the document is stored in the print job box. After the multiple documents are accumulated or stored in the print job box, and the user intends to print out the multiple pieces of the application-generated data accumulated in the print job box, the user displays a print job box window 70 on which the user can make settings of the print job box.

FIG. 5 shows an example of the print job box window 70. According to the first illustrative embodiment, there are mainly two methods to make the print job box window 70 displayed. One is to perform a particular input operation with respect to a job box icon 46 displayed in the device management window 40. An example of the particular input operation is to make a menu list popped up by right-clicking the job box icon 46, and select a menu item (e.g., printer property) for displaying the print job box window 70 from among items in the menu list.

The other method to display the print job box window 70 is to depress a printer property display button 63 in the print instruction screen 50 (see FIG. 3) when the print job box is being selected in the printer selection box 62.

As shown in FIG. 5, in the print job box window 70, a stored job list 73, an output printer icon 74, a print button 76, a setting button 77, a hold button 78 and a delete button 79.

The stored job list 73 includes multiple job icons respectively representing the multiple documents stored in the print job box, that is, multiple documents of which application-generated data stored in the generated data storage area 34. The multiple job icons are arranged in a right-left direction per documents (i.e., per multiple pieces of application-generated data). Further, images of circled numbers are assigned to respective icons to indicate the arranged order.

FIG. 5 shows that there are four print instructions designating the print job box as the use printer in the application software 32. When the print instruction designating the print job box is made four times, one piece of application-generated data is stored in the generated data storage area 34 per each print instruction, and the file name and the thumbnail data of each piece of the application-generated data is stored in the stored data management table 35. Further, the thumbnail data (i.e., the icon data) of each piece of the application-generated data stored in the stored data management table is arranged in the print job box window 70 as shown in FIG. 5.

In the example shown in FIG. 5, job icons 73-1, 73-2, 73-3 and 73-4 of four pieces of application-generated data are displayed. Above the first job icon 73-1, an order image (i.e., a circled number) indicating that the arrangement order is one is displayed. Similarly, above the second, third and fourth job icons 73-2, 73-3 and 73-4, order images indicating that the arrangement order is two, three and four are displayed, respectively.

It is noted that the arranged order of the multiple job icons displayed in the print job box window 70 can be changed by a particular order change operation. At least a drag-and-drop operation is available as the particular order change operation. For example, when the user wishes to exchange a printing order of the first application-generated data and a second application-generated data, the user may drags the first job icon 73-1 and drops the same at a position between the second job icon 73-2 and the third job icon 73-3. Then, the positions of the first and second job icons 73-1 and 73-2 are exchanged. Accordingly, the printing order of the document corresponding to the second application-generated data becomes first, and the order image indicating that the printing order is first is displayed in association with the second job icon 73-2. Further, the order image indicating that the printing order is second is displayed in association with the first job icon 73-1. As above, simply by performing the drag-and-drop operation with respect to the job icon, the user can change the arranged order as desired.

The output printer icon 74 represents a printer (i.e., the printer 10) which is actually used to print out the respective documents represented by the multiple pieces of application-generated data in the print job box. By depressing the printer icon 74 or the setting button 77, a printer property window, which corresponds to the print job box and may be similar to a printer property window 80 shown in FIG. 11, is displayed. In the printer property window, the user can set how the multiple documents in the print job box are printed as the combined print job (e.g., whether N-in-one printing or duplex printing is executed).

The pint button 76 is for continuously printing multiple documents as a combined print job. When the print button 76 is depressed, the multiple application-generated data respectively corresponding to the multiple documents are combined to generated combined print data, which is transmitted to the printer 19. As a result, the combined print job is printed out.

When the user depresses the hold button 78, the screen returns to the previously displayed screen. The delete button 79 is a button for selectively deleting multiple pieces of application-generated data stored in the print job box. When the user has documents not to be included in the combined print job, the user may select the corresponding job icons by depressing the same, and depress the delete button 79. Then, the application-generated data of the documents the user does not wish to be incorporated in the combined print job can be deleted. It is noted that deletion of documents means not only the job icons of the documents are removed from the print job box window 70, but the application-generated data of the documents stored in the generated data storage area 34 is deleted and data corresponding to the application-generated data is deleted from the stored data management table 35.

(5) Installing Process by Installer

In order to use the printer 10 from the PC 20, it is necessary to install the printer driver 333 in the PC 20. Installation of the printer driver 33 in the PC 20 can be executed, for example, by executing an installer which is a program configured to install the printer driver 33. Alternatively, the printer driver 33 may be installed with use of the plug-and-play function. The installer (program) can be obtained, for example, through a network, a CD-ROM (Compact Disc ROM), another storage medium or the like.

Now, with reference to FIG. 6, an installing process executed by the installer will be described. When the CPU 21 of the PC 20 obtains the installer through the network or storage medium and executes the installer. In S10, the CPU 21 start executing the installation of the printer driver 33.

In S20, the CPU 21 generates the normal printer in a system (i.e., the OS 31), When the normal printer is generated, the printer 10 becomes available as a target printer, and a normal printer icon 46, which corresponds to the printer 10 (i.e., the normal printer), is displayed in the device management window 40.

In S30, the CPU 21 generates the print job box, which is the virtual printer for the continuous printing and has the same printer 10 as the output target, in the system. As the print job box is generated, it becomes possible to cause the printer 10 to continuously print multiple documents in a single combined print job. Further, the job box icon 47 corresponding to the print job box is displayed in the device management window 40.

(6) Print Instruction Reception Process

A print instruction reception process will be described, referring to FIG. 7. The print instruction reception process is one of the processes provided by the application software 32 and is executed when a print instruction of a document is made. That is, when the print instruction is made during execution of the application software 32, the CPU 21 starts the print instruction reception process shown in FIG. 7.

When the print instruction reception process is started, the CPU 21 causes the display 26 to display the print instruction screen 60 (see FIG. 3) in S110. In S120, the CPU 21 determines whether printer setting of the use printer is inputted in the printer selection box 62. When the print instruction screen 50 is displayed first, the printer selection box 62 is in a state where a printer which has preliminarily been set as the normally used printer is selected. The normally used printer may be set, for example, in the device management window 40. Step S120 could be interpreted as a process of determining whether an operation to change a printer from the selected one to another in the printer selection box 62 has been done.

When the setting of the use printer has not been inputted (S120: NO), the CPU 21 proceeds to S140. When the setting of the use printer has been inputted (S120: YES), the CPU 21 receives selection of the printer in accordance with the selection operation of the user, and determines the selected printer as the use printer (S130).

In S140, the CPU 21 determines whether a print instruction to execute printing has been made. According to the first illustrative embodiment, the CPU 21 determines whether the print execution button 61 is depressed. When it is determined that the print execution button 61 has not been depressed (S140: NO), the CPU 21 executes a process corresponding to an inputted operation which is not the print execution, and returns to S120. When it is determined that the print execution button 62 has been depressed (S140: YES), the CPU 21 proceeds to S160.

In S160, the CPU 21 outputs the application-generated data of the documents to be printed to the printer driver of the printer which is set to be the use printer. When the printer 10 is set as the use printer, that is, when the normal printer or the print job box is set as the use printer, the application-generated data of the documents to be printed is outputted to the printer driver 33 of the printer 10.

In S170, the operation status of the application software 32 is changed to a printing state. In S180, the CPU 21 waits for reception of a print completion signal from the printer driver of the use printer. When the CPU 21 receives the print completion signal (S180: YES), the CPU 21 changes the operation status of the application software 32 to a print completion state in S190.

(7) Job Box Process by Printer Driver

Referring to FIG. 8, a job box process which is one of the processes to make use of the functions of the printer 10 provided by the printer driver 33 will be described. Specifically, the job box process is a process to realize a function of the print job box. The CPU 21 of the PC 20 periodically executes a program of the job box process (see FIG. 8), which is one of programs i.e., processes) provided by the printer driver 33.

When the job box process shown in FIG. 8 is started, the CPU 21 determines whether the application-generated data designating the print job box as the use printer is received from the application software 32 (S210).

When it is determined that the application-generated data designating the print job box is received from the application software 32 (S210: YES), the CPU 21 proceeds to S220. In S220, the CPU 21 stores the received application-generated data in the generated data storage area 34. In S230, the CPU 21 registers the application-generated data stored in the generated data storage area 34 with the stored data management table 34. According to the first illustrative embodiment, a file name and thumbnail data of the stored application-generated data are stored in the stored data management table 35. Then, in S240, the CPU 21 transmits the print completion signal to the application software 32 and terminates the job box process. By executing S220-S240, one piece of the application-generated data of one document generated by the application software is stored in the print job box.

When it is determined that the application-generated data designating the print job box is not received from the application software 32 (S210: NO), the CPU 21 proceeds to S250. In S250, the CPU 21 determines whether a request to display the print job box window 70 is received. According to the first illustrative embodiment, the request to display the print job box window 70 is one of a particular input operation to the job box icon 47 displayed within the device management window 40, and depression of the printer property display button 63 with the print job box being selected in the printer selection box 62.

When it is determined that the request to display the print job box window 70 has not been received (S250: NO), the CPU 21 terminates the job box process. When it is determined that the request to display the print job box window 70 is received (S250: YES), the CPU 21 displays the print job box window 70 (S260). In S270, the CPU 21 further displays the job icons of respective documents registered with the stored data management table in the registration order within the print job box window 70, based on the stored data management table 35.

In S280, the CPU 21 receives an arrangement changing operation (e.g., aforementioned drag-and-drop operation of an job icon) on the print job box window 70 to arranged the order of the registered documents. In S290, the CPU 21 receives setting changes when the documents stored in the print job box are printed out continuously as a combined print job. For example, when the output printer icon 74 or the setting button 77 is depressed, the CPU 21 displays the printer property window, and receives respective setting change operations applied to the printer property window.

In S300, the CPU 21 determines whether print execution instruction has been made (i.e., whether the print button 76 is depressed). When it is determined that the print execution instruction has not been issued (S300: NO), the CPU 21 determines, in S310, whether another operation has been applied to the print job box window 70. When it is determined that no other instruction has been made (S310: NO), the CPU 21 returns to S280. When it is determined that another instruction has been issued (S310: YES), the CPU 21 executes a process corresponding to the instruction, and terminates the job box process.

When it is determined that the print execution instruction has been issued (S300: YES), the CPU 21 executes the printing process in S330. The printing process of S330 is shown in FIG. 9. In S410, the CPU 21 retrieves multiple pieces of the application-generated data from the generated data storage area 34 in accordance with the designated printing order (i.e., the order of arrangement of job icons within the print job box window 70.

In S420, the CPU 21 merges the multiple pieces of retrieved application-generated data. It is noted that, in this merging process, for example, when a first piece of application-generated data having K pages of print data (i.e., the last page of the first print job being a K-th page) and a second piece of application-generated data are combined, the first page of the second print job is incorporated as a (K+1)-th page of the combined print data. Similarly, when the second piece of application-generated data has L pages of print data, and a third piece of application-generated data is to be further combined, the first page of the third piece of application-generated data is incorporated as a (K+L+1)-th page of the combined print data since the last page of the second piece of application-generated data is incorporated as the (K+L)-th page of the combined print data. In S430, the CPU 21 generates the combined print data based on the data merged in S420. According to the illustrative embodiment, the CPU 21 converts the data merged in S420 to print codes which can be interpreted by the printer 10. It is noted that, when the merged data is converted to the print code, in accordance with the printing method set for the combined print job. For example, when the combined print job is executed in accordance with the N-in-one printing or the duplex printing, the data is converted to print codes to obtain the set print results.

In S440, the CPU 21 outputs the combined image data (i.e., the print codes) generated in S430 to the printer 10. Then, the printer 10 receives the combined print data, and executes printing of the combined print job based on the combined print data. As a result, printing of the combined print job is executed based on the combined print data. That is, multiple documents included in the combined print job are printed such that the pages thereof are continuously outputted. When, for example, the N-in-on printing is designated, the N-in-one printing results are obtained (i.e., pages are printed in the N-in-one format). When the duplex printing is designated, the duplex printing results are obtained.

In S450, the CPU 21 waits for completion of the combined print job. When the combined print job has completed (S450: YES), the CPU 21 proceeds to S460. In S460, the CPU 21 completely deletes the application-generated data stored in the generated data storage area 34 and the data stored in the stored data management table 35.

(8) Effects of First Illustrative Embodiment

As described above, in the PC 20 according to the first illustrative embodiment, when the printer driver 33 to control the printer 10 is installed, the normal printer and the print job box as the continuous printing printer are generated in the system. Both the normal printer and the print job box has the printer 10 as the destination to which the print data is finally transmitted, hut the application-generated data is process in different manners.

When the normal printer is designated as the use printer, every time when the print instruction of a document is made in the application software 32, the application-generated data of the document is transmitted to the printer 10 and the printing is executed. In contrast, when the print job box is designated as the use printer, the application-generated data of the documents is temporarily stored in the generated data storage are 34. Then, when the print execution instruction is made in the print job box window 70, multiple pieces of application-generated data accumulated in the print job box are combined and one combined print job is generated, and print data corresponding to the combined print job is generated and transmitted to the printer 10.

It is noted that the combined print job is generated such that pages of the multiple documents are arranged continuously. For example, when first application-generate data, of which the arrangement order is first, represents a three-page document, and second application-generated data, of which arrangement order is second, represents a five-page document, and the combined print job is generated by combining the first application-generated data and the second application-generated data, a third page of the first application-generated data is a third page of the combined print job, and a first page of the second application-generated data is a fourth page of the combined print job.

Accordingly, when the combined print job is printed in accordance with the duplex printing, the third page of the document of the first application-generated data and the first page of the document of the second application-generated data are printed on both sides of the same printing sheet. In another example, when the combined print job is printed in accordance with a four-in-one printing, all the three pages of the document of the first application-generated data and the first page of the document of the second application-generated data are printed on the same side of the same printing sheet. As above, the multiple documents included in the combined print job are printed such that no blank pages are inserted between subsequent documents, but the multiple documents are combined continuously. Therefore, particularly when the multiple documents are printed collectively and continuously, the user can obtain a desired result.

It is noted that the printer property window corresponding to the print job box is displayed when the printer icon 74 is right-clicked or the setting button 77 is depressed in the print job box window 70, and the printing method of the combined print job can be set through the thus displayed printer property window. In the printer property window of the print job box, a concrete print method of the combined print job such as the duplex printing, N-in-on printing and the like can be set. Accordingly, the user can set the printing method of the combined print job easily and flexibly, and the user can easily obtain the desired print result.

Further, the user can easily check the application-generated data stored in the print job box by displaying the print job box window 70. When the multiple documents are combined to generate one combined print job, the arrangement order of the multiple documents can be changed in the print job box window 70. Therefore, operability when the multiple documents are collectively combined is well improved.

Furthermore, the change of the arrangement order can be done with a simple operation such as a drag-and-drop operation of job icons. Accordingly, the user can change the order of the multiple documents included in the combined print job intuitively and easily.

It is noted that the printer driver 33 is an example of a print control program according to aspects of the disclosures. The PC 20 is an example of an information processing device according to aspects of the disclosures. The HDD 14 is an example of a storage device according to aspects of the disclosures. The CPU 21 of the PC 20 is an example of a controller according to aspects of the disclosures.

Further, step S210 is an example of generated data obtaining process according to according to aspects of the disclosures. Steps S220, S300, S330 are examples of an outputting process according to aspects of the disclosures. In particular, S220 is an example of a storing process according to aspects of the disclosures, and S300 is an example of a print instruction process according to aspects of the disclosures, and S330 is an example of outputting process according to aspects of the disclosures. Step S290 is an example of setting display process and setting process according to aspects of the disclosures, Steps S20 and S30 are examples of registering process according to aspects of the disclosures. A process in which the printer driver 33 outputs the print data to the printer 10 when the print execution button 61 shown in the print instruction screen is depressed under a state where the normal printer (e.g., MFP12345 of ABC Corp.) is designated as the use printer is an example of individual outputting process according to aspects of the disclosures.

Second Illustrative Embodiment

A printing system according to a second illustrative embodiment includes the printer 10 and the PC 20 which have the same configuration as in the first embodiment. Difference between the first and second illustrative embodiments are functions of the printer driver 33 and printers generated in the system as printers subject to be controlled by the printer driver 33.

According to the first illustrative embodiment, as the printer controlled by the printer driver 33, the normal printer and the print job box are generated in the system. In contrast, according to the second illustrative embodiment, only a normal printer is generated as a printer subject to be controlled by the printer driver 33.

Therefore, in a device management window 40 according to the second illustrative embodiment (see FIG. 10), as a printer subject to be controlled, a normal printer icon 46 corresponding to the normal printer is displayed. When the user wishes to cause the printer 10 to print documents of which data is generated by the application software 32, the user needs to designate the normal printer (i.e., MFP12345 of ABC Corp.) as the printer to be used.

Print settings when the normal printer is used can be made in the printer property window 80 for the normal printer. FIG. 11 shows an example of the printer property window 80 for the normal printer.

The printer property window 80 is for acquiring setting operations the user wishes to make the printer 10 to print the documents and includes settings of a size of the printing sheets, an orientation of the printing sheets, a number of copies, a type of printing sheets, a printing quality, a printing color, a layout (e.g., N-in-one), ON/OFF of duplex printing, a sheet feeding method and the like.

According to the second illustrative embodiment, a continuous printing function setting button 81 for enabling (ON) or disabling (OFF) the continuous printing function, and a print instruction button 82 to cause the printer 10 to execute the continuous printing.

For example, the continuous printing function setting button 81 is configured as a so-called radio button, which is turned ON and OFF alternately in response to a click by the user. When the continuous printing function setting button 81 is turned OFF, the continuous printing function is disabled (i.e., OFF).

By turning ON the continuous printing function setting button 81 so that the continuous printing function is enabled, the printer 10 executes printing with using the continuous printing function until the continuous printing function setting button 81 is turned OFF. When the continuous printing function of the normal printer is enabled, and when the normal printer (i.e., MFP12345 of ABC Corp.) is selected as the use printer, the application-generated data is not directly transmitted to the printer 10, but stored in the generated data storage area 34 as is done in the first illustrative embodiment. That is, according to the second illustrative embodiment, a setting function for the continuous printing function is incorporated in the printer property widow 80 of the normal printer.

Accordingly, when the user wishes to immediately print out the print data of a document generated by the application software 32, the user may simply turn of the continuous printing function setting button 81 to disable the continuous printing function in the printer property window 80 of the normal printer, and starts printing.

Alternatively, when the user wishes not to print the documents immediately, and wishes to combine multiple documents and print all the documents as a single print job, the user may turn ON the continuous printing function setting button 81 to enable the continuous printing function, and executes printing.

When application-generated data of all the documents to be combined have been stored in the generated data storage area 34 and the user wishes to combine the data of all the documents and print the same continuously, the user may depress the continuous print instruction button in the printer property window 80 for the printer 10.

When the continuous print instruction button 82 is depressed, a continuous print window 100 as shown in FIG. 12 is displayed. The contents and functions of the continuous print window 100 are identical to the print job box window 70 of the first illustrative embodiment and shown in FIG. 5.

When the continuous print instruction button 82 is depressed and the continuous print window 100 is displayed, the job icons corresponding to the application-generated data stored in the generated data storage area 34 are displayed, as arranged in the order in which the print instructions were made. Then, as described in the first illustrative embodiment, the order of the arrangement of the job icons, deletion of job icons (i.e., application-generated data), detailed setting of printing methods when the combined print job is executed, the print execution instruction of the combined print job can be done though the continuous print window 100.

A print control process according to the second illustrative embodiment will be described with reference to FIG. 13. When the PC 20 is invoked, the CPU 21 of the PC 20 executes the print control process, which is one of programs provided by the printer driver 33 and shown in FIG. 13, periodically.

The CPU 21 of PC 20 determines whether application-generated data is received from the application software 32 in S510. That is, the CPU 21 determines whether application-generated data designating the normal printer (i.e., printer 10) as the use printer to be used is received from the application software 32.

When it is determined that the application-generated data designating the normal printer as the use printer (S510: YES), the CPU 21 proceeds to S520. In S520, the CPU 21 determines whether the continuous printing function is enabled. When it is determined that the continuous printing function is disabled (S520: NO), the CPU 21 executes a normal printing process in S530. That is, the CPU 21 generates print data (i.e., converts into print codes) based on the application-generated data received from the application software 32, and transmits the thus generated data to the printer 10 to cause the printer 10 to print out the transmitted data immediately. After execution of the normal printing, the CPU 21 proceeds to S560.

When the continuous printing function is enabled (S520: YES), the CPU 21 stores the application-generated data received from the application software 32 to the generated data storage area 34 (S540). In S550, the CPU 21 registers the application-generated data stored in the generated data storage area 34 with the stored data management table 35. Then, in S560, the CPU 21 transmits the print completion signal to the application software 32 and terminates the print control process. In S540-S550, one piece of application-generated data corresponding to one document is stored in the generated data storage area 34, and accumulated therein as a document of which data could be included in the combined print job.

When it is determined that the application-generated data designating the normal printer is not received from the application software 32 (S510: NO), the CPU 21 proceeds to S570 and determines whether a request to display the printer property window 80 has been made.

It is noted that the request to display the printer property window 80 is a user operation to display the printer property window 80, and an example of such an operation is to depress the printer property display button 63 in the print instruction screen 50 (see FIG. 3) of the application software 32. Another example is to select a menu item to display the printer property window 80 (e.g., "printer property") in the menu list which may be popped up as the user right-clicks the normal printer icon 46 in the device management window 40.

When the request to display the printer property window 80 is not made (S570: NO), the CPU 21 terminates the print control process. When the request to display the printer property window 80 is made (S570: YES), the CPU 21 displays the printer property window 80 in S580.

In S590, the CPU 21 determines whether setting of the continuous printing function has been changed, that is, whether an input operation with respect to the continuous printing function setting button 81 (i.e., to turn ON/OFF) has been made. When it is determined that the setting of the continuous printing function has not been made (S590: NO), the CPU 21 proceeds to S610. When it is determined that the setting of the continuous printing function has been made (S590: YES), the CPU 21 receives the change of the setting in S600. That is, when the continuous printing function setting button 81 which is not turned ON has been turned ON, the CPU 21 enables the continuous printing function.

In S610, the CPU 21 determines whether the continuous print instruction button is depressed. When it is determined that the continuous print instruction is not depressed (S610: NO), the CPU 21 proceeds to S640, where a process corresponding to the user input is executed, and terminates the print control process. When it is determined that the continuous print instruction button 82 is depressed (S610: YES), the CPU 21 displays the continuous print window 100 (FIG. 12) in S620.

In S630, the CPU 21 displays the job icons respectively corresponding to the multiple pieces of application-generated data stored in the generated data storage area 34 within the continuous print window 100 in the order of stored date/time based on the stored data management table 35. After execution of S630, the CPU 21 proceeds to S645.

As shown in FIG. 14, the CPU 21 receives the user operation to change the arrangement order of the documents i.e., the job icons) in the continuous print window 100 (e.g., aforementioned drag-and-drop operation of job icons in S645. Then, in S650, the CPU 21 determines whether the print execution instruction has been made (i.e., whether the print button 76 has been depressed). When it is determined that the print execution instruction has been made (S650: YES), the CPU 21 executes printing in S660.

When it is determined that the print execution instruction has not been made (S650: NO), the CPU 21 proceeds to S670. In S670, the CPU 21 determines whether a setting change instruction (e.g., depression of the setting button 77) when the combined print job is executed has been made. When it is determined that the setting change instruction has been made (S670: YES), the CPU 21 proceeds to S680 and displays a setting screen (e.g. a screen somewhat similar to the printer property window 80) for the combined print job, receives setting change operations, and returns to S645.

When it is determined that the setting change instruction has not been made (S670: NO), the CPU 21 proceeds to S690 and determines whether another instruction operation has been made in the continuous print window 100. When it is determined that no other instruction operation has been done (S690: NO), the CPU 21 returns to S645. When it is determined that another instruction has been made (S690: YES), the CPU 21 proceeds to S700 and execute a process corresponding to the instruction operation.

As described above, in the PC 20 according to the second illustrative embodiment, the printer property window 80 (FIG. 11) for the printer 10 is additionally provided with the continuous printing function setting button 81 to enable/disable the continuous printing function. By turning on the continuous printing function setting button 81 to enable the continuous printing function, even thought the print instruction of documents is made through the application software 32 with designating the printer 10, printing of the documents may not be immediately executed and the application-generated data of the multiple documents are stored in the generated data storage area 34.

It is note that the printer property window of the printer 10 is provided with the print instruction button 82 in addition to the continuous printing function setting button 81. When the print instruction button 82 is depressed, the continuous print window 100 (FIG. 12) is displayed, and the multiple pieces of application-generated data stored in the generated data storage area 34 are displayed in an arranged manner in the continuous print window 100. The user can change the arranged order of the multiple pieces of application-generated data, delete desired one(s) of the multiple pieces of application-generated data, and make print instruction of the combined print job, as can be done in the print job box window 70 according to the first illustrative embodiment.

When the user wishes to print multiple documents one by one, the user may simply turn off the continuous printing function button 81 to disable the continuous printing function. As above, with simple input operation with respect to the continuous printing function setting button 81, the user can enable/disable the continuous printing function.

It is noted that, in the second illustrative embodiment, step S600 is an example of an output method setting process according to aspects of the disclosures. Step S530 is an example of an individual output process according to aspects of the disclosures. Step S580 is an example of a selection screen displaying process according to aspects of the disclosures. Step S590 is an example of a selection acquiring process according to aspects of the disclosures. Step S610 is an example of a request acquiring process according to aspects of the disclosures.

Other Embodiments

It is noted that the aspects of the disclosures should not be limited to configurations of the above-described illustrative embodiments. The aspects of the disclosures could be modified in various ways.

(1) In the second illustrative embodiment, when the continuous printing function is enabled, the application-generated data may be merged every time the print instruction is issued. The second illustrative embodiment may be further modified such that the combined print data for the combined print job may be generated based on the merged data when the continuous printing function is disabled, and the combined print data is transmitted to the printer 10 at that timing.

(2) In the second illustrative embodiment, when the continuous printing function is once enabled and they disabled, the continuous print window 100 (FIG. 12) may be automatically displayed and encouraging the user to generate or execute the combined print job.

(3) In addition to the above-described modified embodiments, a function realized by a single component according to the above-described illustrative embodiments may be realized by multiple components, or functions realized by multiple components may be integrated such that multiple functions are realized by a single component. At least a part of the components of the above-described illustrative embodiments may be replace with conventional components having the same functions. Further, at least a part of the components may be omitted. Furthermore, at least a part of configuration of the first illustrative embodiment may be added to or replace a part of the configuration of the second illustrative embodiment, or vice versa.

What is claimed is:

1. A non-transitory computer-readable medium for an information processing device, the information processing device having a storage device configured to store data and a controller, the computer-readable medium storing instructions which, when executed by the controller, causing the information processing device to control a printing device connected to the information processing device,
the instructions causing the controller to execute to:
register an individual output registered printer and a combined output registered printer with the information processing device as a registered printer configured to output multiple pieces of application-generated data, print data corresponding to the application-generated data being transmitted from the registered printers to a printing device, the individual output registered printer being configured to transmit multiple pieces of print data respectively corresponding to the multiple pieces of application-generated data to the printing device piece by piece, the combined output registered printer being configured to transmit a single piece of combined print data to the printing device;
obtain a piece of application-generated data which is data generated by an application program and representing images to be printed on one or more pages of printing sheets;
when a piece of application-generated data designating the individual output registered printer is obtained:
generate the print data to be printed by the printing device based on the piece of application-generated data designating the individual output registered printer; and
output the generated print data to the individual output registered printer designated by the application-generated data;
when multiple pieces of application-generated data designating the combined output registered printer are obtained;
temporarily store the multiple pieces of application-generated data in the storage device;
receive a particular print instruction;
combine the multiple pieces of application-generated data stored in the storage device to generate combined print data, the combined print data representing a combination of images represented by each of the multiple pieces of application-generated data so that pages of images represented by the multiple pieces of application-generated data are continuously arranged; and
output the generated combined print data to the combined output registered printer.

2. The non-transitory computer-readable medium according to claim 1,
wherein the information processing device comprises:
a display configured to display images; and
an input device configure to receive user operation with respect to images displayed on the display,
wherein the instructions further cause the controller to execute to:
display a setting screen configured to receive setting of a printing method of the combined image to be printed when a particular request operation is accepted through the input device; and
receive the particular setting operation input through the input device, and set the printing method of the combined print images, and
generate the combined print data in accordance with the set printing method.

3. The non-transitory computer-readable medium according to claim 2, wherein, on the setting screen, a print instruction image used to receive the particular print instruction is displayed; and wherein the controller receives an input operation through the input device with respect to the print instruction image on the setting screen as the particular print instruction.

4. The non-transitory computer-readable medium according to claim 2, wherein the controller is configured to receive at least a page order setting operation to set an order of the multiple pages of the images to be printed constituting the combined print images as the setting operation and set the order of the multiple pages in accordance with the page order setting operation.

5. The non-transitory computer-readable medium according to claim 4, wherein, on the setting screen, data images respectively representing multiple pieces of application-generated data stored in the storage device are displayed with being arranged in accordance with the page order, and wherein, the controller is configured to receive a drag-and-drop operation to change arranged positions of the data images as the page order setting operation, the page order being set in accordance with the arranged positions of the data images on the setting screen.

6. The non-transitory computer-readable medium according to claim 2, wherein the controller is configured to receive at least a combining order setting operation to set an order of the multiple pieces of application-generated data to be printed as the setting operation and set the combining order of the multiple pieces of application-generated data in accordance with the combining order setting operation.

7. The non-transitory computer-readable medium according to claim 6, wherein, on the setting screen, data images respectively representing multiple pieces of application-generated data stored in the memory are displayed with being arranged in accordance with the combining order, and wherein, the controller is configured to receive a drag-and-drop operation to change arranged positions of the data images as the combining order setting operation, the combining order being set in accordance with the arranged positions of the data images on the setting screen.

8. The non-transitory computer-readable medium according to claim 1, wherein the instructions further cause the controller to execute to:

set one of an individual output method and a combined output method as a method to output print data corresponding to the multiple pieces of application-generated data to the printing device, the individual output method being a method to transmit multiple pieces of print data respectively corresponding to the multiple pieces of application-generated data to the printing device piece by piece, the combined output method being a method to transmit a single piece of combined print data to the printing device;

when the individual output method has been set at a time when a piece of application-generated data is obtained, generate the print data to be printed by the printing device based on the piece of application-generated data;

output the generated print data to the printing device; and temporarily store in the storage device when the combined output method has been set at a time when the application-generated data is obtained.

9. The non-transitory computer-readable medium according to claim 8, wherein the instructions further cause the controller to execute to:

display an output method selection screen allowing the user to select one of the individual output method and the combined output method; and receive a user operation with respect to the output method selection screen to select one of the individual output method and the combined output method, and wherein the controller sets a selected one of the individual output method and the combined output method as the output method.

10. The non-transitory computer-readable medium according to claim 9, wherein a particular combination requesting image requesting for generation of the combined print data based on multiple pieces of application-generated data stored in the storage device is displayed on the output method selection screen, wherein the instructions further cause the controller to execute to receive an input operation through the input device on the combination requesting image on the output method selection screen, and wherein the controller executes to receive the particular print instruction when the combination requesting image is selected.

11. The non-transitory computer-readable medium according to claim 1, wherein the controller is configured to combine multiple pieces of application-generated data stored in the storage device to generate combined print data such that, when a first piece of application-generated data and a second piece of application-generate data are combined in this order, a first page of the second piece of application-generated data is combined as a (K+1)-th page of the combined print data, given that a last page of the first piece of application-generated data is a K-th page of the combined data.

12. The non-transitory computer-readable medium according to claim 1, wherein the instructions further cause the controller to execute to:

change an operation status of the application program to a printing state;

receive a print completion signal from a printer driver;

change the operation status of the application program to a print completion state in response to the print completion signal being received from the printer driver.

13. An information processing device, comprising:

a memory; and a controller configured to execute to:

register an individual output registered printer and a combined output registered printer with the information processing device as a registered printer configured to output multiple pieces of application-generated data, print data corresponding to the application-generated data being transmitted from the registered printers to the printing device, the individual output registered printer being configured to transmit multiple pieces of print data respectively corresponding to the multiple pieces of application-generated data to the printing device piece by piece, the combined output registered printer being configured to transmit a single piece of combined print data to the printing device;

obtain a piece of application-generated data which is data generated by an application program and representing images to be printed on one or more pages of printing sheets;

when a piece of application-generated data designating the individual output registered printer is obtained:
  generate the print data to be printed by the printing device based on the piece of application-generated data designating the individual output registered printer; and
  output the generated print data to the individual output registered printer designated by the application-generated data;

when multiple pieces of application-generated data designating the combined output registered printer are obtained;
  temporarily store in the storage device;
  receive a particular print instruction;
  combine the multiple pieces of application-generated data stored in the memory to generate combined print data, the combined print data representing a combination of images represented by each of the multiple pieces of application-generated data such that pages of images represented by the multiple pieces of application-generated data are continuously arranged; and
  output the generated combined print data to the combined output registered printer.

14. The information processing device according to claim 13,
  wherein the controller is further configured to execute to:
  change an operation status of the application program to a printing state;
  receive a print completion signal from the printer driver;
  change the operation status of the application program to a print completion state in response to the print completion signal being received from the printer driver.

15. An information processing device connected to a printing device, comprising:
  a memory; and
  a controller configured to:
  register an individual output registered printer and a combined output registered printer with the information processing device as a registered printer configured to output the multiple pieces of application-generated data, print data corresponding to the application-generated data being transmitted from the registered printers to the printing device, the individual output registered printer being configured to transmit multiple pieces of print data respectively corresponding to the multiple pieces of application-generated data to the printing device piece by piece, the combined output registered printer being configured to transmit a single piece of combined print data to the printing device;

when multiple pieces of application-generated data respectively corresponding to multiple pieces of documents to be printed are obtained:
  store the obtained multiple pieces of application-generated data in the memory;
  determine combining order of the multiple pieces of application-generated data stored in the memory;
  combine the multiple pieces of application-generated data in accordance with the determined combined order to generated combined application-generated data;
  generate single piece of print data based on the combined application-generated data with applying a particular printing option; and
  output the generated single piece of print data to the printing device;

when a piece of application-generated data designating the individual output registered printer is obtained, generate the print data to be printed by the printing device based on the piece of application-generated data designating the individual output registered printer; and
output the generated print data to the printing device.

16. The information processing device according to claim 15, wherein no additional page is inserted when the controller combines the multiple pieces of application-generated data to generate the combined application-generated data.

17. The information processing device according to claim 16, wherein the particular printing option is an N-in-one printing.

18. The information processing device according to claim 16, wherein the particular printing option is a duplex printing.

19. The information processing device according to claim 15,
  wherein the controller is further configured to execute to:
  change an operation status of the application program to a printing state;
  receive a print completion signal from the printer driver;
  change the operation status of the application program to a print completion state in response to the print completion signal being received from the printer driver.

* * * * *

UNITED STATES PATENT AND TRADEMARK OFFICE
CERTIFICATE OF CORRECTION

PATENT NO. : 9,681,018 B2  
APPLICATION NO. : 15/084573  
DATED : June 13, 2017  
INVENTOR(S) : Minoru Oishi Page 1 of 1

It is certified that error appears in the above-identified patent and that said Letters Patent is hereby corrected as shown below:

In the Claims

Column 20, Claim 13, Line 63 should be corrected to read:
a printing device, the individual output registered Signed and Sealed this
Twenty-ninth Day of May, 2018

Andrei Iancu
*Director of the United States Patent and Trademark Office*